(12) United States Patent
Cepas et al.

(10) Patent No.: US 6,477,035 B1
(45) Date of Patent: Nov. 5, 2002

(54) INTEGRALLY FORMED ENERGY STORAGE DEVICE AND METHOD OF FABRICATION

(75) Inventors: Bruce M Cepas, Orlando, FL (US); James A Korn, Jr., Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/974,033

(22) Filed: Oct. 10, 2001

(51) Int. Cl.[7] .............................................. H01G 4/228
(52) U.S. Cl. ..................................... 361/306.3; 361/329
(58) Field of Search .......................... 361/306.1, 306.3, 361/328, 329, 829, 830, 301.4

(56) References Cited

U.S. PATENT DOCUMENTS

| | | | |
|---|---|---|---|
| 4,101,804 A | * 7/1978 | Carlsson | |
| 5,567,544 A | 10/1996 | Lyman | 429/152 |
| 5,793,603 A | 8/1998 | Lyman | 361/503 |
| 6,219,218 B1 | * 4/2001 | Nial et al. | 307/91 |
| 6,226,173 B1 | 5/2001 | Welsch et al. | 361/508 |
| 6,300,564 B1 | * 10/2001 | Moraes et al. | 174/52.1 |
| 6,341,056 B1 | * 1/2002 | Allman et al. | 257/295 |

* cited by examiner

Primary Examiner—Anthony Dinkins

(74) Attorney, Agent, or Firm—Sidley Austin Brown & Wood LLP; Steven S. Sedacca

(57) ABSTRACT

A capacitive electrical energy storage structure is fabricated as a thin-film device comprising electrodes on opposite sides of a dielectric layer. In one approach, a high surface area metallic sponge can be incorporated into the structure. The energy storage structure can comprise either single or multiple layers of capacitors connected in series, parallel, or a combination of such arrangements. The multi-layer capacitor structure can be either applied directly to supporting structures of portable or transportable devices or can be fabricated as a film which is applied as a laminate to such structures. Further, a conformal energy storage structure can be produced which is shaped to fit in voids within devices, which voids would otherwise be little used or unused. A high capacity storage thin-film structure can be fabricated on one surface of a substrate with an immediately adjacent, overlapping power consuming electronic circuit such that power is available at very short distance to support operational circuits which cannot tolerate long conductive power supply lines. Portable consumer devices can be fabricated with the interiors of the housings conformally coated with the capacitive structure for providing energy storage as a replacement to rechargeable or disposable batteries. A flexible film of the capacitive structure can be manufactured by a continuous process and this film can be utilized in many different configurations to provide energy storage which is lightweight, configurable to available space, and capable of providing both high energy and high power density.

23 Claims, 8 Drawing Sheets

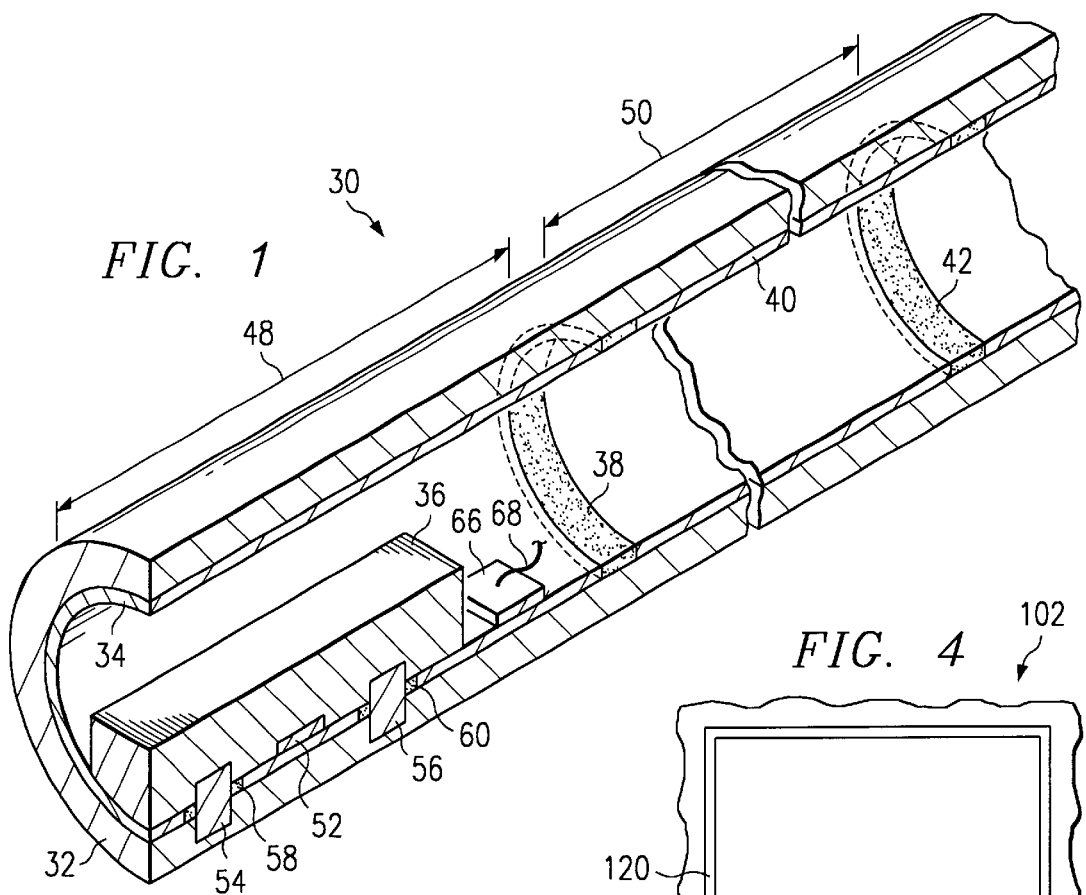
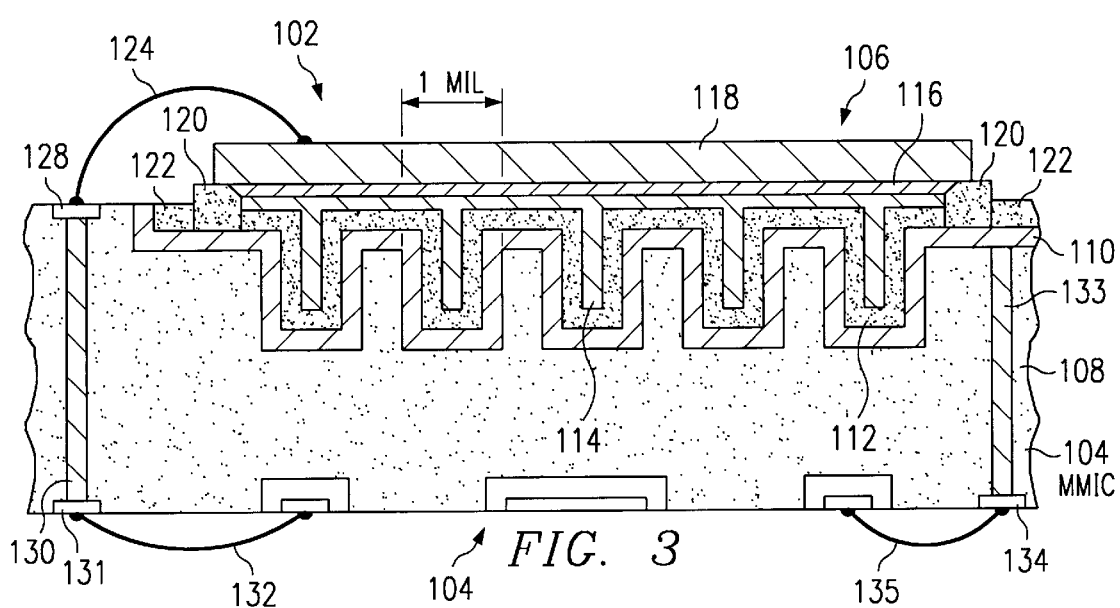

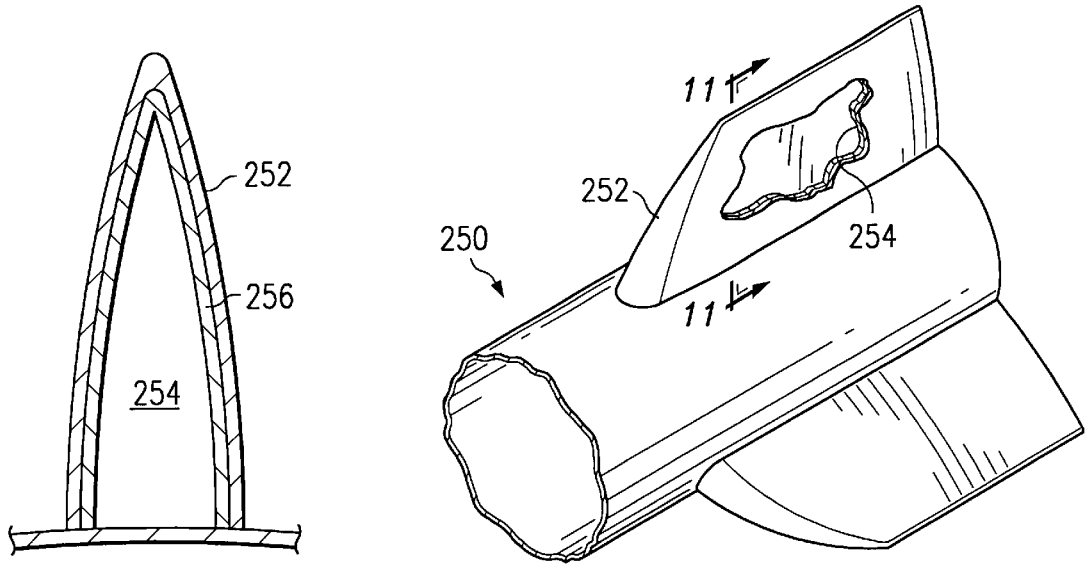
FIG. 11
FIG. 10
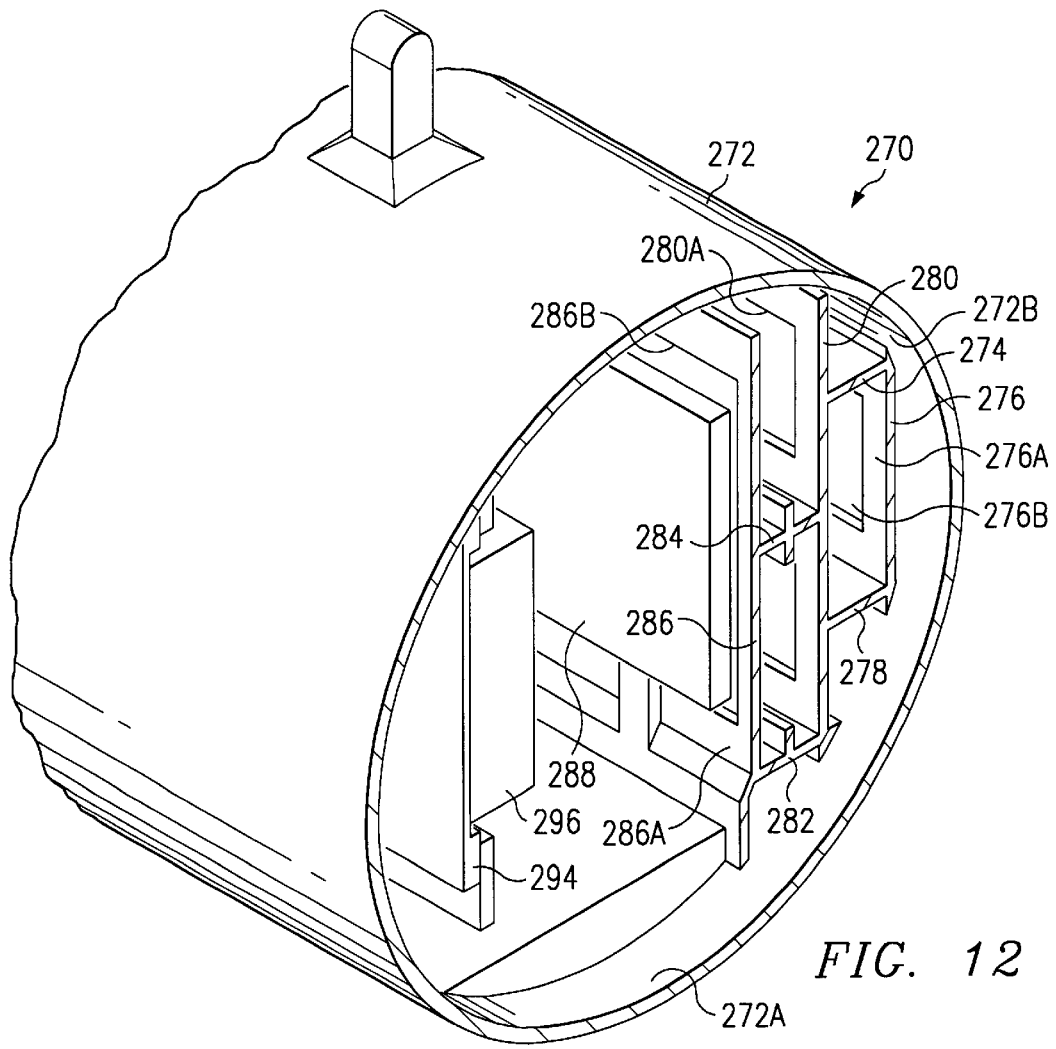
FIG. 12

INTEGRALLY FORMED ENERGY STORAGE DEVICE AND METHOD OF FABRICATION

TECHNICAL FIELD OF THE INVENTION

The present invention relates generally to electrical energy storage devices and more particularly to capacitor structures having high energy storage and high power delivery capability.

BACKGROUND OF THE INVENTION

Electronic equipment which is portable or transported must have a source of electrical power that has minimum weight and volume, but maximum capacity for power and energy density. The amount of energy stored and the peak power capability are principle parameters of a prime energy storage device. Compact commercial and military electronic systems have electrical and packaging constraints that are imposed by the volume and weight of the apparatus. These constraints determine the necessary energy and power density of the power source.

Examples of current prime energy storage devices include both non-rechargeable and rechargeable technologies. Nickel-cadmium (Ni—Cd) batteries, lithium-ion (Li-ion) batteries, and ultra capacitors are all examples of rechargeable energy storage devices. Rechargeable devices are re-energized by external power sources and are optimum for multi-use applications. Ideal rechargeable systems can store charge for long periods of time (also known as "shelf-life"). Lithium-based thermal batteries are an example of non-rechargeable energy storage devices. A primary energy storage device (non-rechargeable) contains an adequate amount of energy to operate through the life of the device. This type of energy storage device is discarded or destroyed at the end of use.

Existing commercial rechargeable energy storage technologies do not meet the power density and peak power requirements of future, high power electronic systems which undergo rapid mode changes during system operation (e.g., cell phone mode changes from idle to transmit). Present thermal batteries, such as used in missiles, generate enormous amounts of heat during activation and thus require insulation or remote packaging away from thermally sensitive electronics, thereby presenting additional design challenges such as thermal management.

In addition to the power requirements, existing energy storage technologies are generally packaged without considering the shape of the installation locations. For example, in missile applications electronics are generally packaged as cubic modules. Therefore, when placed into the curved interior of a missile, there are segments of the interior that don't readily house the typical packaging geometry for current energy storage devices. Additionally, when an energy storage device is situated in an apparatus that has an internal volume other than that of presently used packaging technology, unused space remains (i.e., the arc segments that remain when a square box is placed in a cylindrical housing and volumes associated with structural features such as wings, fins and so forth). Therefore, discretely packaged battery solutions have a further drawback of underutilization of space, which can limit electronics volume and thus overall system performance.

A capacitor structure which provides very high storage capacity is described in U.S. Pat. No. 6,226,173 B1 which issued on May 1, 2001 and is entitled "Directionally-Grown Capacitor Anodes." This patent describes a dendritic sponge which is formed through chemical processing on a body of titanium. This process creates a large surface area which is then coated with a dielectric. By use of selected dopings of the anode, the subsequent dielectric formed on the anode can have a very high dielectric constant. An electrolyte is applied to the opposite side of the dielectric to serve as an electrical conductor (cathode) and to prevent breakdowns by re-oxidizing the dielectric surface at areas of local breakdown. A capacitor formed in this way can have a very high energy and power density per unit weight and volume.

Therefore, there is a need for a high energy density and high power density energy storage technology. Further, there is a need for power source technology that can utilize the currently available volumes in commercial and military applications, by, for example, forming the power source integrally with the structure and/or into unique geometric shapes.

SUMMARY OF THE INVENTION

An electrical energy source provides power for electronic equipment carried within an airborne vehicle. The vehicle has an elongate body section which encloses an interior volume. A multi-layer capacitor structure is provided on a non-planar interior surface of the body section. The capacitor structure has a conformal shape that matches to that of the interior surface of the vehicle. The capacitor structure stores electrical energy for use by the electronic equipment. Terminals are provided which connect the capacitor structure to the electronic equipment for transferring electrical power from the capacitor structure to the electronic equipment. The capacitor structure can be fabricated either directly on the mounting surface or fabricated separately and mounted to the interior surface of the vehicle.

A further embodiment of the present comprises an integrated electronic circuit together with a power supply on a planar substrate. The electronic circuit is formed as a portion of the substrate. A capacitor structure is joined to and is in parallel with the substrate. The capacitor structure stores electrical energy. The capacitor structure is positioned such that it is substantially overlapping with the electronic circuit on the opposite side of the substrate. Power terminals provide connections between the capacitor structure and the electronic circuit for transferring electrical power from the capacitor structure to the electronic circuit.

A further embodiment of the present invention is a capacitor stack for providing electrical power to electronic equipment positioned within an interior space of a vehicle. A plurality of planar capacitor structures are bonded together in parallel to form the capacitor stack. The vehicle has a shaped space therein which is at least partially defined by an exterior surface of a housing for the electronic equipment and a portion of a wall of the interior space. Each of the planar capacitor structures has a shape such that the capacitor stack in combination has an exterior configuration substantially corresponding to the shaped space and whereby the capacitor stack can be positioned within the shaped space to substantially fill the shaped space.

A further embodiment of the present invention is a power source for a portable electronic device which has a housing and electric power consuming circuitry therein. The housing of the portable electronic device has an interior surface. A film capacitor structure is joined over a majority of the area of the structure to at least a portion of the interior surface of the housing. The capacitor structure has a configuration that conforms to the shape of the interior surface. The capacitor structure can store electrical energy therein. Power terminals are provided which connect the capacitor structure to the power consuming circuitry for transferring electrical power.

A further embodiment of the present invention is a method for manufacturing a web of electrically capacitive material which comprises a sequence of processing steps conducted in one or more chambers wherein a metallic layer is applied to a surface of a film, an oxide layer is formed on the surface of the metallic layer, a metallic sponge is formed for the metallic layer, a dielectric oxide is formed on the metallic sponge, an electrolyte is applied to the surface of the dielectric oxide, and a metallic layer is formed on the electrolyte to produce a capacitor electrode, thereby producing a web of capacitive material which can be stored as a roll.

A still further embodiment of the present invention is an electrical power source for providing electrical power to equipment carried in an airborne vehicle. The vehicle has an elongate body section which enclosed an interior volume that has one or more structural braces therein. A multi-layer capacitor structure has a majority of the area thereof mounted on a surface of one of the structural braces. The capacitor structure functions to store electrical energy therein. Power terminals are provided for connecting the capacitive structure to the electronic equipment for transferring electrical power.

BRIEF DESCRIPTION OF THE DRAWINGS

For a more complete understanding of the present invention, reference is made to the following drawings taken in conjunction with the Detailed Description, in which:

FIG. 1 is a partially cut away, section view of a tubular body of a missile airframe illustrating the incorporation of a capacitive structure on the interior surface with connections to an electronic device inside the airframe, FIG. 3 is a section view of a semiconductor device having a power consuming amplifier on one side of a substrate and a capacitive energy storage device on the opposite side of the substrate, FIG. 4 is a plan view of the semiconductor structure shown in FIG. 3, FIGS. 5A–5I show the processing steps for fabricating a high capacity capacitor structure on a titanium foil, FIG. 10 is an illustration of a control fin arrangement for a missile airframe with a showing of the interior of the fin, FIG. 11 is a section view of the fin shown in FIG. 10 illustrating the incorporation of a capacitive structure on the interior surface of the fin, FIG. 12 is a cutaway view of a portion of a missile airframe showing structural brackets and electronic equipment modules with surfaces which incorporate thin film energy storage structures.

DETAILED DESCRIPTION

Figure 2A:
FIGS. 2A–2H illustrate a sequential process for fabricating the capacitor structure within the airframe body shown in FIG. 1.

The present invention provides high density energy storage devices in a limited volume with the shapes of the storage devices being adaptable to the available space. Referring now to FIG. 1, there is illustrated a body 30 which comprises a portion of an airframe for a missile. The body 30 has a generally cylindrical configuration, but it could equally well have other configurations. The body 30 has a cylindrical, load bearing external wall 32 made of a material such as steel, titanium, aluminum or a synthetic material such as graphite, kevlar, fiberglass, or other composite laminate or equivalent. A multi-layer capacitive structure 34 is fabricated on the interior surface of the wall 32. Structure 34 provides for storage of electrical power for operation of electrical and electronic devices within the body 30. A detailed configuration of each layer of the capacitive structure 34 is illustrated in FIGS. 2A–2H. The body 30 may have, for example, a diameter of 7 inches and the thickness of the wall 32 can be 0.25 inch.

The body 30 includes one or more electrical power consuming devices 36 which can be, for example, a microwave transmitter or laser pulse generator. The device 36 is mounted within the interior of the body 30. The capacitive structure 34 is applied as a continuous layer on the interior of the wall 32. The structure 34 is terminated by an insulating ring 38 which comprises a material such as teflon, epoxy, cork, or other electrically insulative material. A second interior capacitive structure 40 is fabricated on the interior of the wall 32 and is electrically insulated by a second insulating ring 42.

The first capacitive structure 34 extends along a segment 48 of the body 30 and the second capacitive structure 40 extends along a body segment 50 of the body 30. In a selected embodiment, the body segment 48 has a length of 24 inches, the capacitive structure 34 has 82 layers (capacitors) with a total thickness of 0.21 inch, has a total capacity at 10.9 farads, stores 400,000 joules of energy and has a peak voltage of 330 volts. In a selected embodiment, the body segment 50 has a length of 24 inches, the capacitor structure has 111 layers with a total thickness of .28 inch, has a capacity of 800 farads, stores 10,000 joules of energy and has a peak voltage of 5.5 volts. In each of the sections 48 and 50 the capacitors in the multiple layers are electrically connected in parallel. Each of the layers has a thickness of approximately 65 microns. The dielectric thickness for the 5.5 volt peak capacitor is approximately 16 nanometers, and for the 330 volt peak capacitor the dielectric thickness is approximately 990 nanometers.

The power consuming device 36 is electrically connected to an interior surface, or cathode layer, of the capacitive structure 34 by a terminal 52, and is further connected electrically to the anode structure wall 32 by conductive pins 54 and 56 which are respectively insulated from the cathode layer of the structure 34 by insulating rings 58 and 60. These pins can also be configured to provide a parallel connection for all of the capacitive layers wherein each pin is connected to common electrodes.

A charging terminal 66 includes a lead 68 that is connected to a wiring harness within the body 30 of the missile. The terminal 66 is connected to the cathode of the capacitive structure 34. The anode of the structure 34 is electrically connected to the conductive wall 32 which serves as a common terminal for the electrical supply associated with the missile having body 30.

The capacitive structure 34 preferably comprises a substantial number of layered capacitors, for example 96 capacitors connected in parallel. While the airframe which includes body 30 is being stored and transported, there is no electrical power stored within the capacitive structure 34. When usage of the missile is required, dc electrical power is applied between the wall 32 (anode) and the line 68, which is connected to the cathode of the capacitive structure 34. Electrical power is transferred into the capacitive structure 34 until a predetermined voltage level is reached. This may be, for example, 330 volts. After the capacitive structure 34 has been fully charged, the missile is launched and the stored electric energy is provided via terminals 52, 54, and 56 to the electronic device 36. The capacitive structure 34 has sufficient energy storage capacity to provide the necessary electrical power to device 36 for the duration of a mission for the missile.

A sequence of steps for fabricating the capacitive structure 34 are described in reference to FIGS. 2A–2H. These figures are not necessarily to scale or shape, but are drawn to describe the manufacturing process and structure. In FIG. 2A there is shown a layer 80 which comprises a segment of the wall 32. In a preferred embodiment, this comprises titanium or a titanium alloy (for example, BaTi) having a thickness of approximately .25 inch. Optionally, the layer 80 can be aluminum or steel with a thin layer 82 of titanium (25 microns) which is deposited on the interior surface of the wall 32.

The process for manufacturing the capacitive structure for use herein can be the same as that described in U.S. Pat. No. 6,226,173 B1, Ser. No. 09/238,082 filed Jan. 26, 1999, which is incorporated herein by reference. This patent is referred to herein as the '173 patent. The layer 80 serves as the anode of the capacitive structure 34.

Figure 2B:

As an optional approach, referring to FIG. 2B, the layer 82 is oxidized and this layer is reduced back to metal to form a directional sponge of the layer 82, as shown in the '173 patent. This optional process produces a metallic sponge which has a substantially greater surface area than the original planar metal layer.

Figure 2C:
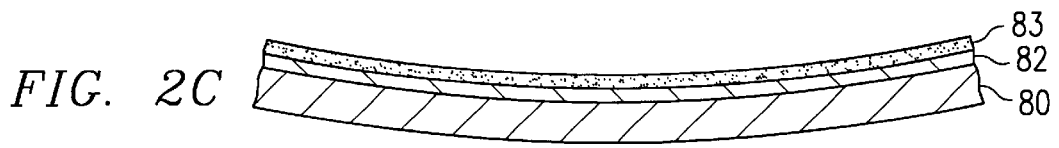

In FIG. 2C, which is a preferred alternative to the process described in FIG. 2B, a layer 83 of metal oxide is formed on the exposed surface of the layer 82 for forming a dielectric layer for a capacitor. The dielectric oxide layer can be formed in multiple ways, preferably it is anodically grown in solution. See the '173 patent for a further description. The dielectric layer 83 has a thickness which is a function of the operating voltage of the energy storage device. See the '173 patent for a further description of this process.

Figure 2D:
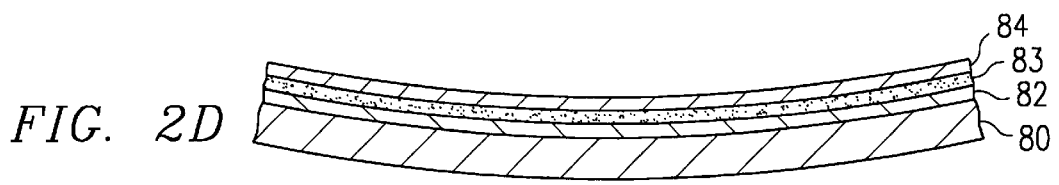

In the next step, as shown in FIG. 2D, an electrolyte, such as manganese dioxide ($MnO_2$) is processed on the exposed surface of the dielectric oxide layer 83. The electrolyte fills voids and forms an intimate contact with the previously formed dielectric oxide layer. This electrolyte is shown as layer 84 and it serves two functions. The first is to provide electrical conductivity and thereby function as one plate of a capacitor, and the second function is to supply oxygen to the dielectric where the dielectric breaks down, and therefore it functions as a repair mechanism to maintain the integrity of the dielectric layer of the capacitor.

Figure 2E:
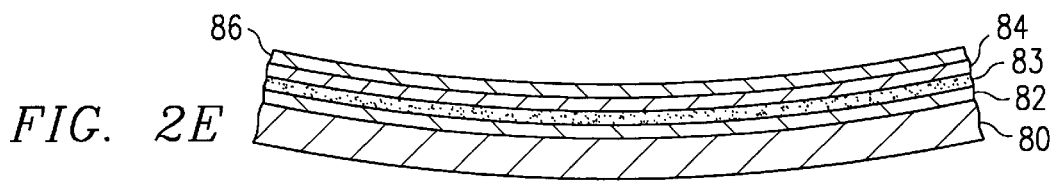

The next step of the fabrication process is shown in FIG. 2E. A layer 86 of graphite is applied such as by sputtering or by being brushed on and dried. The latter process comprises the application of carbon ink which is painted on and thermally cured. The graphite layer 86 is a conductive material which functions as a barrier to the manganese dioxide, which is a very strong oxidizing agent. The manganese dioxide layer 84 cannot be allowed to contact a metal directly, therefore the graphite provides a barrier that protects the succeeding metal layer and provides electrical conductivity. The graphite layer 86 also functions to fill any pores in the surface irregularities of the electrolyte layer 84 because this layer tends to follow the surface features of the underlying sponge of layer 82, when this optional approach is selected.

Figure 2F:
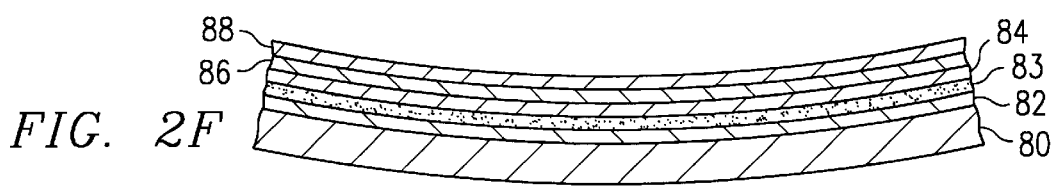

In FIG. 2F there is shown the application of a layer 88 of silver, which can be a sputtered silver film, a silver epoxy or silver paint. Note that the silver layer 88 is protected from the manganese dioxide layer 84 by the intervening barrier layer 86 of graphite.

Figure 2G:
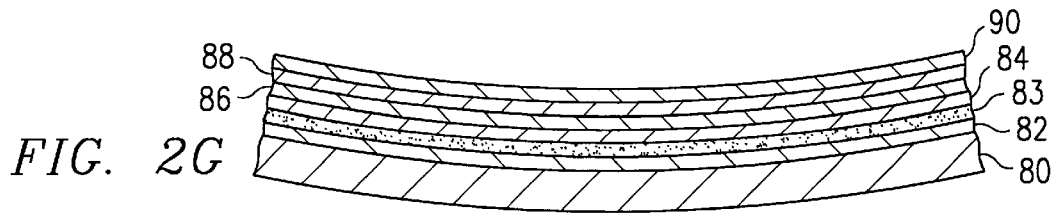
Figure 2H:
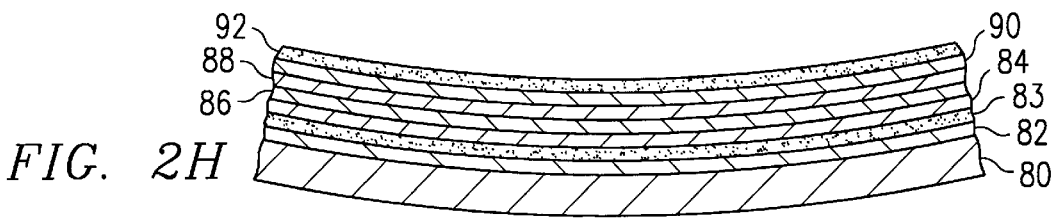

Referring to FIG. 2G, a layer 90 of tin or solder dip is applied to the surface of the silver layer 88 to protect layer 88 from corrosion. The structure shown in FIG. 2G forms a complete capacitive energy storage device with layer 80 functioning as the anode electrode of a polarized capacitor and layer 92 being the cathode electrode of the capacitive structure. The overall thickness of the structure shown in FIG. 2 is approximately 65 microns.

For multiple layers of capacitors connected in series, a layer of titanium or titanium alloy, corresponding to layer 80 shown in FIG. 2A, is deposited on the top of the layer 90 and the processes described in FIGS. 2A–2G are repeated. In this arrangement, the capacitors are electrically connected in series as they are stacked.

In a preferred embodiment, such as that shown in FIG. 1, 82 such capacitors are produced and the overall thickness of the multi-layer capacitor stack is approximately .021 inch. Note that the thickness does not include the layer 80 which represents the wall 32 of the airframe body 30. In this approach to provide parallel connection of capacitive structures, referring to FIG. 2H, a surface insulation layer 92 is applied which can comprise a material such as teflon having a thickness of approximately .005 mil. Subsequent capacitive structures can be applied on the surface of the layer 92 to form a series of capacitor structures that are insulated from each other. This is done by repeating the steps 2B through 2H for each capacitor.

For connecting the capacitors in structure 34 electrically in parallel, a region at an end of each capacitor anode layer is exposed for connection to all of the other anode layers by a common line and this line is connected to the outer surface of the structure 34, such as layers 80 or 82 of the innermost capacitor. The cathode layers of each capacitor in structure 34 are likewise interconnected at one end thereof with a second common line which is connected to the inner electrode of the structure 34, such as layer 90.

A further embodiment of the present invention is illustrated in FIGS. 3 and 4. A semiconductor device 102 comprises a substrate which has an electronic circuit designed for a specific application on one side of the substrate, and a capacitive electrical power storage structure fabricated on the opposite side. In the present illustrated embodiment, the functional electronic circuit is a millimeter wave integrated circuit high power amplifier (MMIC HPA) 104, and on the opposite side of the substrate is a power storage structure 106. The power storage structure is a capacitor which stores electrical energy for powering the circuit 104. The device 102 includes a substrate 108 which can be silicon, gallium arsenide, silicon carbide, or other suitable semiconductor material that can be optionally surfaced area enhanced by etching grooves or channels as shown to increase the effective plate area. Fabricated into the substrate 108 is a first electrode layer 110 which preferably comprises titanium or a titanium-based alloy.

Immediately above layer 110 is a dielectric layer 112 comprising an oxide of the metal comprising layer 110, in which is produced thermally, anodically or by mechanical application over the electrode layer. A solid electrolyte 114 is applied as a layer over the dielectric layer 112. An example of the electrolyte is manganese dioxide, as in the previously described embodiment.

Immediately on the surface of the electrolyte layer 114 there is formed a graphite layer 116 which, just as previously described, serves as a barrier to the manganese dioxide with respect to an overlying electrode. Overlying the layer 116 is a metalization layer 118, preferably made of gold, having a thickness of approximately 25 microns.

The cathode electrode layer 118 is connected by a wire bond 124 to a pad 128 which is connected to a via 130 that is in turn connected to a pad 131 on the opposite surface of the substrate 108. A wire bond 132 is connected between pad 131 and a component of the circuit 104. The anode electrode layer 110 is connected to a via 133 which is connected to a pad 134. A wire bond 135 connects from pad 134 to a further component of circuit 104.

Note that each of the downward extending units of the power structure 106 has a width of approximately 1 mil. This downwardly extending unit includes a U-shaped portion of the electrode layer 110, an interior U-shaped portion of the layer 112, and a downward extension of the electrolyte layer 114. These U-shaped channels are one example of a technique to enhance the effective plate surface area. Other options for surface enhancement include V-channels, or other methodologies which provide additional anode surface area beyond that of a flat plate configuration.

The power storage structure 106 is electrically connected directly to the circuit 104 for providing power thereto. In an application where the circuit 104 is an MMIC HPA, for example an RF transmitter, circuit 104 may need to operate by generating pulses with extremely fast rise times, such as less than 10 nanoseconds. Such pulses are designed to be transmitted from an antenna and may require substantial energy and such energy must be readily available to the circuit 104.

The power storage structure 106 can be connected to the circuit 104 by means of through-the-substrate connecting lines or around-the-edge connecting lines of sufficient size to carry the required electrical power. With the configuration shown in FIG. 3, the power structure can be located immediately adjacent and parallel to the circuit 104. Thus, the propagation distance from the structure 106 to the circuit 104 is only a fraction of an inch. As a result, stored electrical power can be rapidly transferred from the power storage semiconductor structure 106 to the circuit 104 for utilization therein.

The boundary of the power structure 106 on the substrate 108 is defined by an insulating ring 120 which extends around the periphery of the conductive layers 114 and 116.

Referring to FIG. 4, there is shown a plan view of the semiconductor device 102 illustrating the cathode electrode layer 118, the insulating ring 120 and an exterior conductive area 122 which can comprise the anode of the power structure 106.

Figure 5A:
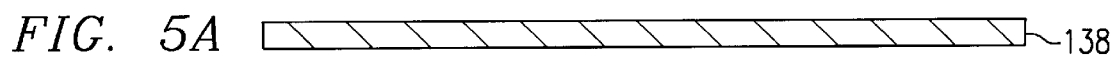

A still further embodiment of the present invention is a foil configuration power storage structure which is fabricated as shown in the steps 5A–5I. The fabrication process begins in FIG. 5A. A foil substrate 138 comprises titanium or an alloy such as BaTi which has a thickness of 1–3 mils.

Figure 5B:
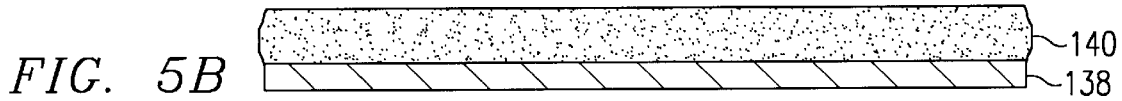

Referring to FIG. 5B, an oxide layer 140 of thermally grown $TiO_2$ (or optionally $BaTiO_x$) is produced for a desired metal sponge depth, which is preferably in the range of 1000–5000 microns. Details of this process are shown in the above incorporated '173 patent.

Figure 5C:
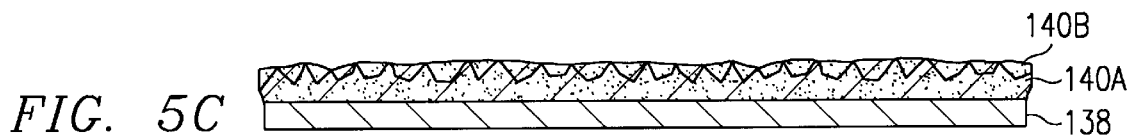

Referring now to FIG. 5C, the oxide layer 140 is reduced to a metallic sponge layer 140A by use of the processes described in the '173 patent, thereby leaving CaO material 140B within the crevices of layer 140A. This step is performed by the application of Ca vapor at a temperature of approximately 900 degrees C.

Figure 5D:
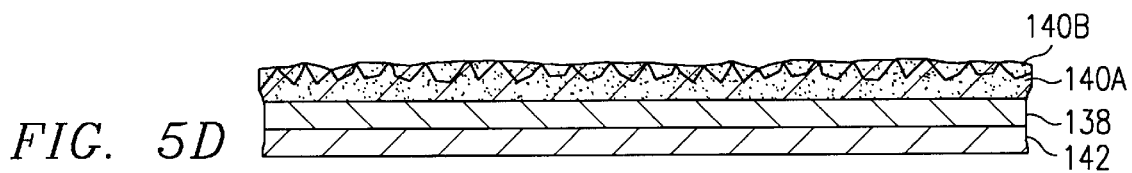

The next step in the process is shown in FIG. 5D. A layer 142 of gold film (or other equivalent conductive metal) is sputter applied to a thickness of approximately 25 microns on the back side of the foil layer 138 to form a contact for later assembling a stacked unit.

Figure 5E:
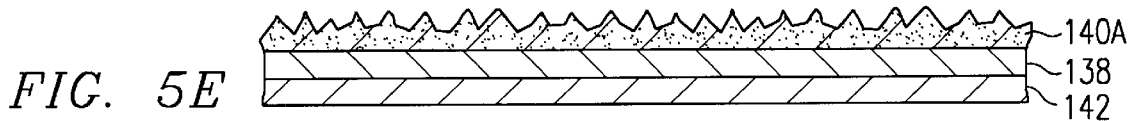

Referring to FIG. 5E, the material 140B shown in FIG. 5D is leached in distilled water to remove the CaO reactant from the directional metal sponge and this is followed by a distilled water bath.

Figure 5F:
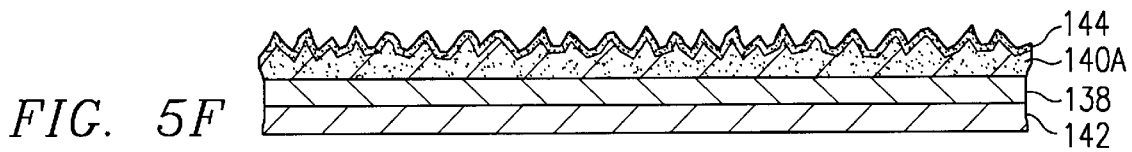

Referring now to FIG. 5F, the layer 140C of titanium metallic sponge is subject to an anodization process to produce a layer 144 of titanium oxide ($TiO_2$). A sufficient voltage is applied during the anodization process to assure that there is minimum leakage such that at the operating voltage of the resulting capacitor, there will be little loss of stored charge. An applicable anodization process is described in the '173 patent and in the patents referenced therein.

Figure 5G:
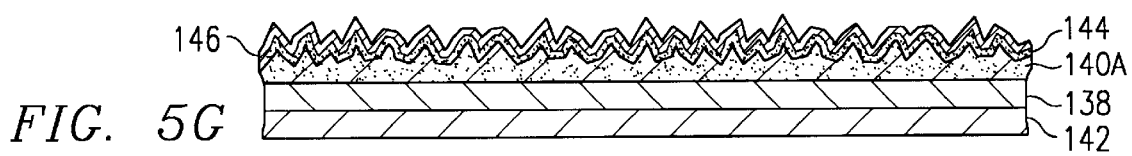
Figure 5H:
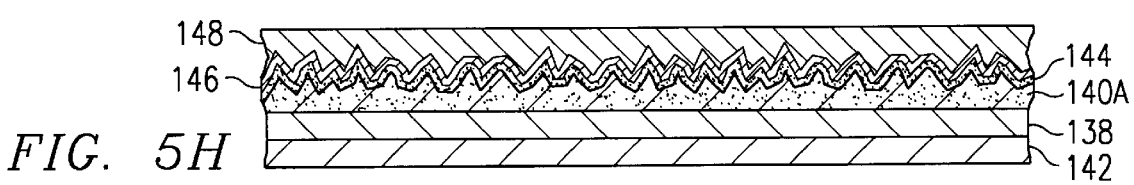

Referring now to FIG. 5G, an electrolyte layer 146 of $MnO_2$ is applied through the sponge layer 140C and into contact with the dielectric oxide layer 144. In FIG. 5H, a layer 148 of graphite is applied through the metal sponge 140C for contact with the electrolyte layer 146.

Figure 5I:
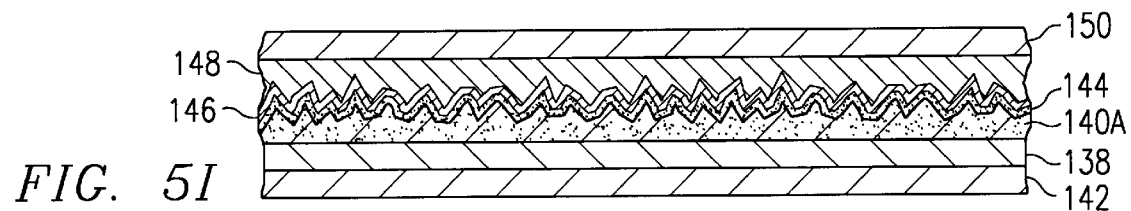

In a final step, referring to FIG. 5I, a layer 150 of gold is sputter applied to the top of layer 140C for forming a cathode capacitor terminal.

Figure 6:
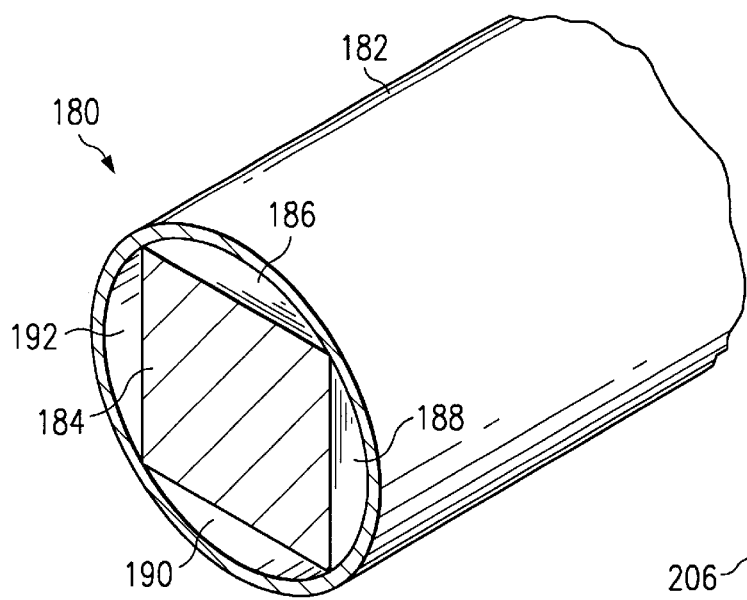
FIG. 6 is a section and perspective view of a portion of a missile airframe having an interior packaged electronic device.

Referring now to FIG. 6, there is shown a portion of an airframe 180 having a cylindrical casing 182 and an electronic module 184 mounted within the casing 182. The module 184 has a rectangular configuration and when positioned within the casing 182 forms arc-shaped voids 186, 188, 190 and 192. Most sub-assemblies used within a missile airframe, as well as power sources such as batteries, have a rectangular or round configuration that is not adaptable for utilization within the voids 186–192. If such a module or battery is of sufficiently small size to fit within one of the voids, it will not only be of minimal size and effectiveness, it will still leave a substantial unused volume within the void. One aspect of the present invention is the design and utilization of an energy storage structure which is shaped to have a configuration that will fit within such a void and thereby optimize the utilization of such spaces.

As described above in reference to FIG. 5, a foil-based energy storage structure can be fabricated in accordance with the present invention. This device has a thin, planar structure which can be die-cut in any planar configuration.

Figure 7:
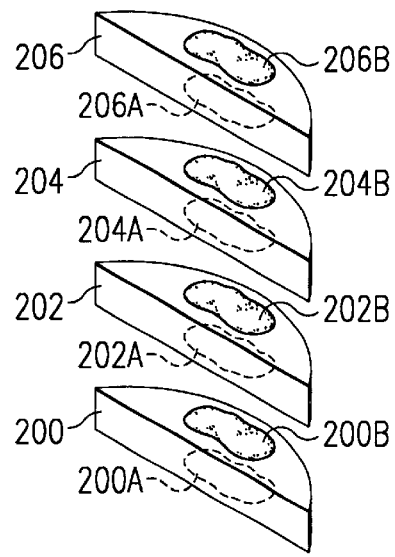
FIG. 7 is an illustration of a set of die cut foil capacitors.

Referring to FIG. 7, there are shown die-cut sections 200, 202, 204 and 206, each of which has opposite planar surfaces. The opposite surfaces are respectively the anode and cathode of each energy storage capacitor. Each of the sections 200–206 has an arc configuration corresponding to a section of one of the voids, such as 186 shown in FIG. 6. The lower surfaces of the sections 200–206 have respective silk-screened solder paste layers 200A, 202A, 204A and 206A. The upper surfaces have silk-screened solder paste layers 200B, 202B, 204B and 206B.

Figure 8:
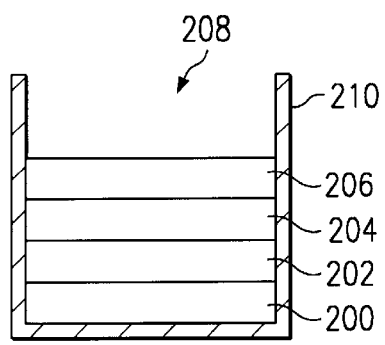
FIG. 8 is an illustration of a capacitor stack comprising a plurality of the foils shown in FIG. 7 for producing a shaped capacitor storage structure.

Referring now to FIG. 8, there is shown a stacked capacitor device 208 comprising the group of die-cut sections 200–206. These sections are assembled in a holding fixture 210 which is heated to reflow the solder paste to connect the sections 200–204 physically as a stacked unit 208 wherein the sections are electrically connected in series.

Figure 9:
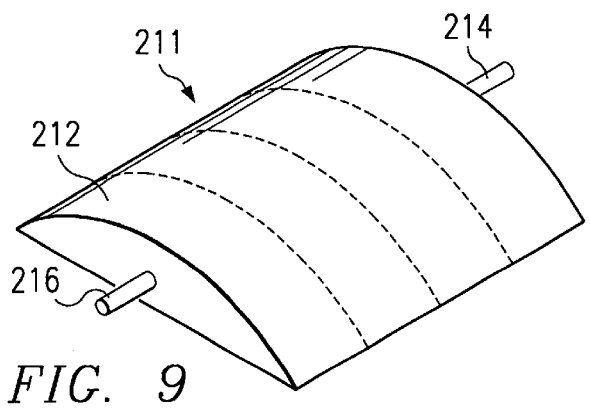
FIG. 9 is a completed shaped capacitor stack for conformal installation in a corresponding shaped void.

Referring to FIG. 9, there is shown a completed energy storage device 211 which has the stack capacitor unit 208 enclosed by a nonconductive cover or housing 212. This housing provides environmental protection and electrical insulation for all the individual sections and the device 211 as a whole. The first of the enclosed die-cut sections has a first lead 214 connected to a surface such as 200A (see FIG. 7) and a second conductive lead 216 connected to a second surface, such as 206B of the last of the sections. The leads 214 and 216 are connected to a wiring harness within the airframe. The composite energy storage device 211 is positioned within a void, such as 186 shown in FIG. 6. The outer configuration of the device 211 matches the shape of the void 186, thereby optimizing the use of the available space.

Referring now to FIG. 10, there is shown a missile airframe 250 having a fin 252. The fin 252 has an interior volume 254. A section view of the fin 252 is shown in FIG. 11. An aerodynamically configured fin has the interior volume 254 which has a complex configuration based on the structural requirements of the airframe 250 and the aerodynamic requirements of the fin and the missile surfaces. It is difficult to make productive use of the volume 254. However, in the present invention, a multi-layer capacitor structure 256 is formed on the interior surfaces of the fin 252. The capacitor structure 256 is fabricated in the same manner as described in FIGS. 2A–2H for the structure 34 shown in FIG. 1. By building the thin-film capacitor structure 256 within a fin, such as 252, additional energy storage capacity is provided to the airframe 250 without the requirement to use additional space.

A still further illustration of applying the present invention is shown in FIG. 12. An airframe 270 has an exterior casing 272 which corresponds to the casing 32 shown in FIG. 1. The interior of the airframe 270 includes various spars, ribs and brackets that provide structural support to the airframe as well as providing mounting locations for interior components, such as electronic modules. Within the airframe 270, plates 274, 276 and 278 are mounted, such as by welding, to the interior of the casing 272, and together form a bracket. A plate 280 is mounted to the plates 274 and 278 and is connected to structural plates 282 and 284. A plate 286 is connected to the plates 282 and 284 opposite plate 280. A rectangular electronic module 288 is mounted on an exposed surface of the plate 286.

A bracket 294 is mounted to the interior of the casing 272 and provides support for an elongate module 296.

There are numerous unused surfaces available within the airframe 270 for fabrication of thin-film capacitive structures as described above. These include surfaces 272A on the interior of the casing 272, 276A on the interior of the plate 276, 280A on the interior surface of the plate 280, and 284A on the surface of the plate 284. By applying thin-film capacitor structures at these various surfaces, the unused volume within the airframe 270 can be utilized to store additional electrical power. The plates further provide the structural basis for supporting the capacitive structures and also serve as a common cathode for all of the capacitors. The plates shown in the airframe 270 can be made of aluminum, titanium, steel, other metals or may be made of synthetic materials as listed above. Such synthetic materials would require an additional electrical lead because the substrate would not be conductive.

A capacitive structure 272B is fabricated on the interior surface of the casing 272 on the surface 272A. A thin-film capacitive structure 276B is fabricated on the surface 276A of the plate 276. A thin-film planar capacitive structure 286B is fabricated on the surface 286A of the plate 286.

Figure 13:
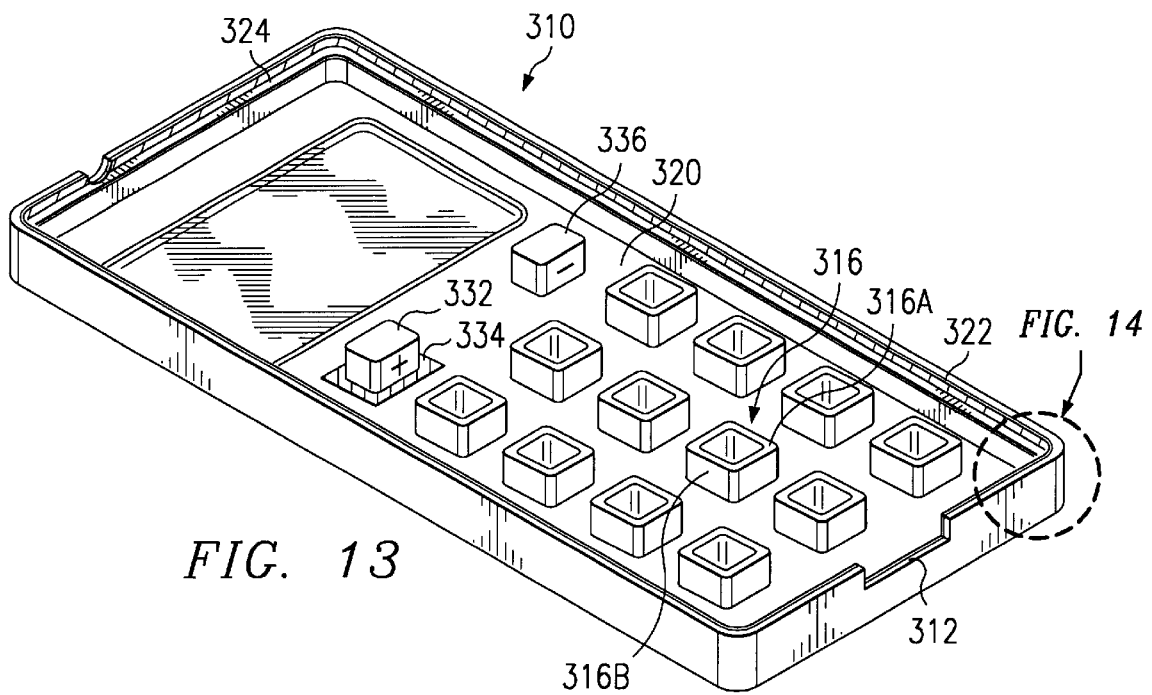
FIG. 13 is a perspective view of a case for a cellular telephone wherein the case has a capacitive structure formed on the interior surface for serving as an energy source for the operative electronics of the cellular telephone.
Figure 14:
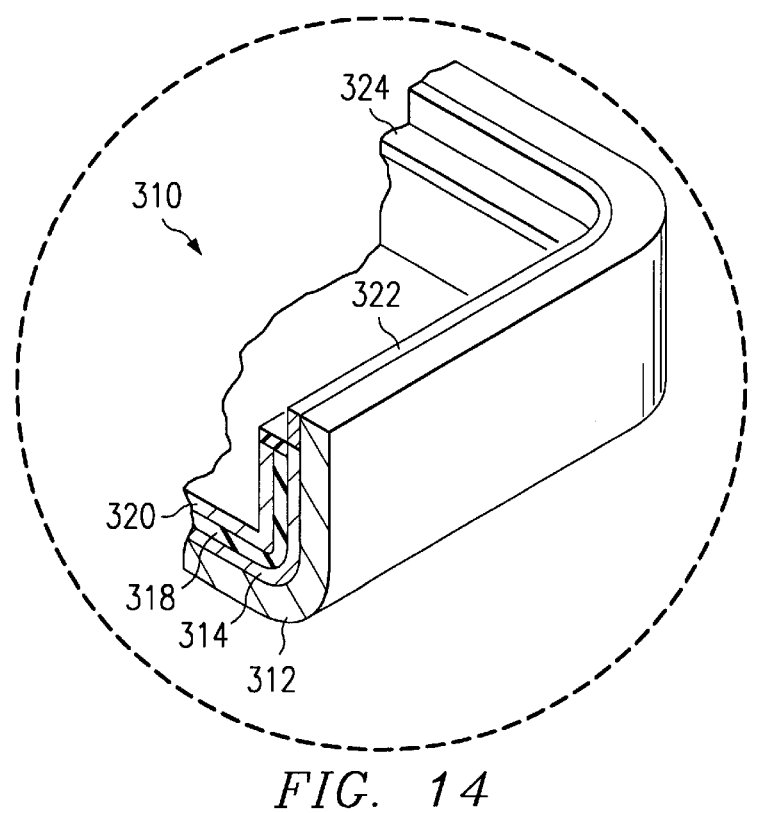
FIG. 14 is a section view of a corner of the cellular telephone case shown in FIG. 13.

A still further embodiment of the present invention is shown in FIGS. 13 and 14. There is shown in these figures a portion of a housing 310 for a cellular telephone. An opposed matching portion completes the housing and the electronic components are included between the two housing pieces. The housing 310 is a structural plastic layer 312 which provides the structural integrity for the housing 310. Plastic layer 312 is an electrical insulator. On the immediately interior surface of the layer 312 there is provided a first electrode 314 (anode) which is applied as a thin layer of titanium or titanium alloy which covers most of the interior surfaces of the housing 310. The housing includes a plurality of upstanding members such as member 316, which has a rectangular outer configuration with a rectangular center hole for receiving a push-button key. The upstanding member 316 has a top surface 316A and four side surfaces 316B. The electrode layer 314 extends to cover the top and side surfaces of all of the members, such as 316 and the surfaces 316A and 316B.

A dielectric layer 318 is applied to the surface of the electrode 314. The dielectric layer is a metal oxide anodically formed and having a thickness based on the voltage rating of the energy storage device. The dielectric layer extends to cover all of the available interior surfaces of the housing 310 where the layer 312 is present, including on the sides and top of the upstanding members such as 316.

A second electrode 320 is fabricated on the surface of the dielectric layer 318 and likewise extends to cover all of the available surface area within the interior of the housing 310. The electrode 320 serves as the cathode of the capacitive structure which comprises layers 314, 318 and 320. Electrode 320 comprises successive layers of $MnO_2$, graphite, silver and tin and in combination these layers comprise the cathode of the storage device.

The upper limit of the electrode 314 is defined by a masking layer 322. An insulating layer 324 extends along the edges of the dielectric layer 318 and electrode 320 to provide electrical insulation between layers 314 and 320 (anode and cathode).

An electrical conducting terminal 332 is isolated by insulation 334 so that it is electrically connected to the electrode layer 314 but electrically isolated from the electrode 320. An electrical terminal 336 is connected directly to the electrode layer 320 to provide electrical connection to the capacitive energy storage structure.

The combination of the layers 314, 318 and 320 comprise an energy storage film which has an overall thickness of approximately 1.0 mils. This electrical storage film can store electrical power for operating the cell telephone through the terminals 332 and 336. These terminals can likewise be used to initially store electrical power into the storage film. The storage film can be repeatedly recharged to provide electrical power for the cell telephone. In contrast to a battery, the capacitive storage film can be very quickly charged, on the order of seconds, as opposed to the charging time of many minutes or hours required for rechargeable batteries.

Options for the design of the energy storage film shown in FIGS. 13 and 14 include a plurality of capacitive layers stacked one on the other to provide additional electrical storage capacity. A still further option is to include the fabrication process wherein a metallic sponge is formed, as described above, for the dielectric and corresponding electrodes such that there is greater surface area and therefore greater electrical energy storage. The second half of the housing for enclosing the cellular telephone can likewise have a similar coating to provide additional energy storage capability.

Specific application examples for utilization of the invention as described in reference to FIGS. 13 and 14 include power tool housings, laptop computer cases, cellular telephone cases, handheld GPS cases, media player cases such as compact disk, DVD and MP3, hand held games, and any other portable electrically powered device.

Figure 15:
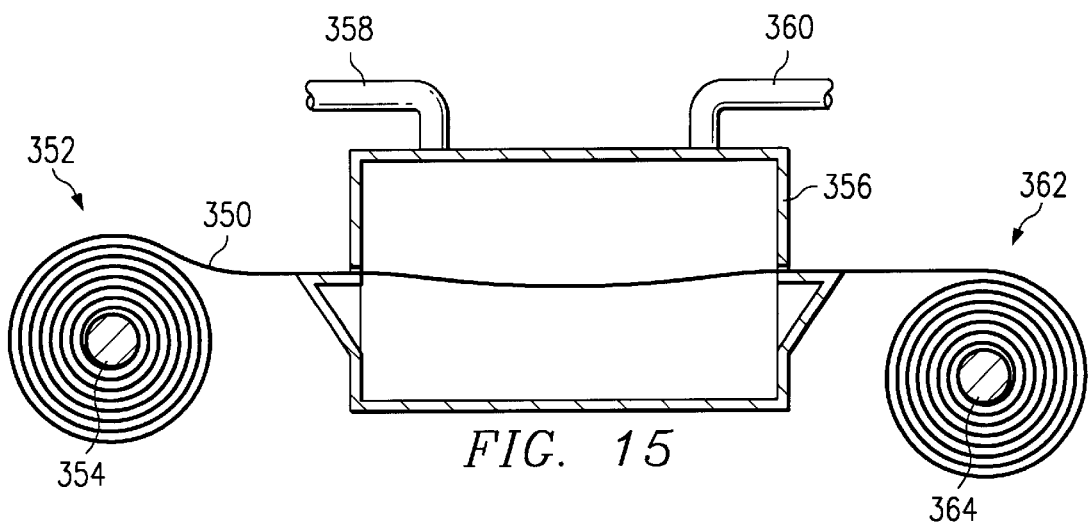
FIG. 15 is an elevation view of equipment for continuous processing of film for producing large volumes of flexible, high capacity, capacitive storage thin film.

A continuous process for producing capacitive energy storage film (web) in accordance with the present invention is shown in FIG. 15. The film is fabricated on a polymer sheet 350 which is stored in an unprocessed roll 352 that is supported on a rotating rod 354. The sheet 350 may have, for example, a length of 2000 feet, a width of 2.0 feet, and have a film thickness of 1.0 mils. The sheet of film 350 is fed into a processing chamber 356 which includes a plurality of inlet and outlet lines such as 358 and 360. The sheet 350 is processed within the chamber 356 and is then transferred to a take-up roll 362 that is supported by a rod 364 which can be driven to pull the sheet 352 through the chamber 356.

For the complete processing operation for the sheet 350, refer to FIGS. 2A–2H as well as FIG. 15. The preferred capacitive structure in this embodiment does not utilize the sponge metal processing step described as an option in FIGS. 2A–2H. The processing for the sheet 350 is the same as that described in the FIGS. 2A–2H, but with the film 350 replacing the supporting structure 80 shown in FIGS. 2A–2H. The processing chamber 356 is replicated with multiple such chambers to provide each of the processing steps shown in FIGS. 2A–2H. The sheet 350 on roll 352 is initially processed through a chamber, such as 356, to perform a processing operation to apply a titanium layer to the surface of the film. The process is operated continuously to produce the roll 362 which comprises the film with the titanium layer applied thereto. The roll 362 is then placed in the position of roll 352 and applied through another processing chamber to perform the next sequential step which is forming a layer of titanium oxide on the surface of the titanium layer. After this process is completed for the entire roll, the take-up roll, is them transferred to the input of a further processing chamber to perform the process described in FIG. 2D.

The entire length of the sheet 350 is fed through each chamber for performing each sequential processing step. This includes the processes shown in FIGS. 2E, 2F, 2G and a final application of an overlying insulator in step 2H. The resulting product is a roll of processed film having 2000 linear feet of capacitive material which can be used many ways, with specific examples as shown in the following figures. This is a production process which can produce the capacitive structure in a way that is less expensive and more rapid manner than direct application of the capacitive layers to structural members of an airframe, such as described in reference to FIG. 1.

As an option to the processing of feeding the sheet 350 through a processing chamber, the sheet 350 could be placed entirely within a chamber statically for each processing step.

Figure 16:
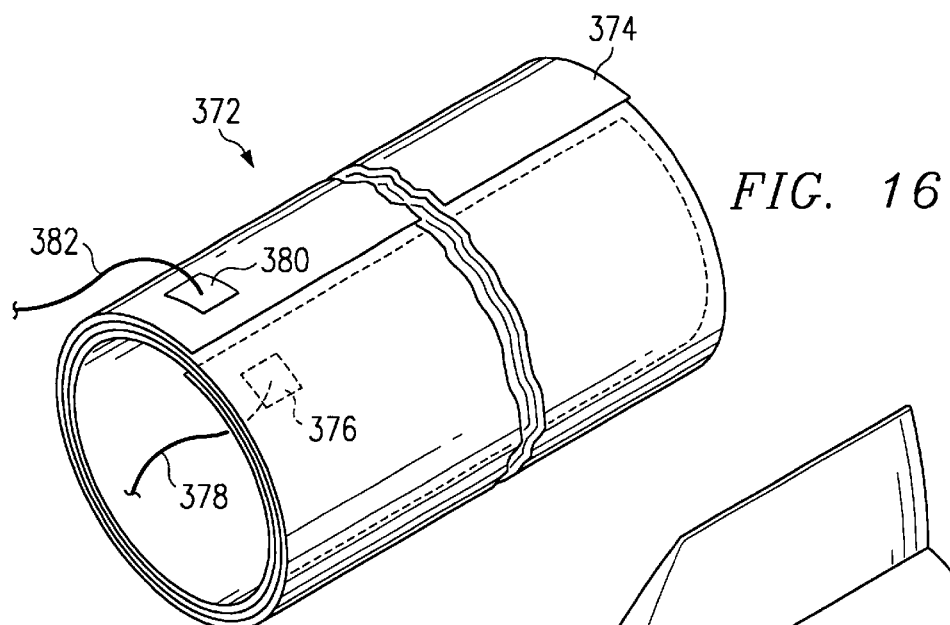
FIG. 16 is a perspective view of a prime energy storage capacitive structure fabricated by use of the continuously produced film as shown in FIG. 15.

Referring to FIG. 16, a capacitive energy storage device 372 is made with the flexible thin-film produced in accordance with the processes described in reference to FIG. 15. A length of film 374 is wrapped about a cylindrical form (not shown), and a binding material, such as epoxy, is applied to the touching surfaces of the film to fix the shape and size of the energy storage device 372. The interior surface of the cylindrical device 372 is etched through the surface insulation to form a contact pad 376 to which is connected a line 378. Likewise, on the exterior surface of the cylindrical device 372 an etching step is performed to expose the outer electrode and a contact pad 380 is formed and it is connected a conducting line 382. The lines 378 and 382 provide a path for the initial charging of the capacitive energy storage device 372, as well as for supplying power from the device to an electronic apparatus.

Figure 17:
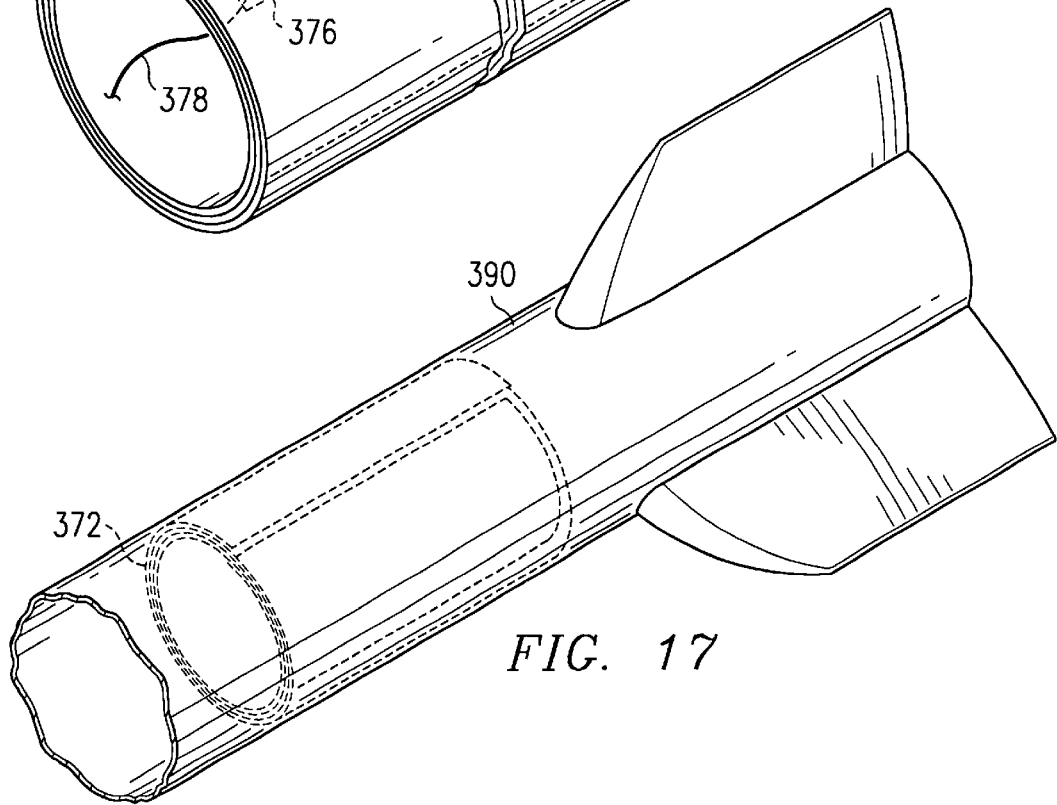
FIG. 17 is an illustration of the cylindrical capacitive structure shown in FIG. 16 as applied to the interior surface of an airframe.

Referring to FIG. 17, the energy storage device 372 is positioned on the interior of a cylindrical airframe 390 and is bonded to the interior surface of the airframe 390 by a material such as epoxy. The lines 378 and 382 are connected to the wiring harness within the airframe for receiving and supplying electrical power. The configuration shown in FIG. 17 is an alternative to the direct fabrication of the capacitive structure on the interior casing wall of the airframe 390.

Figure 18:
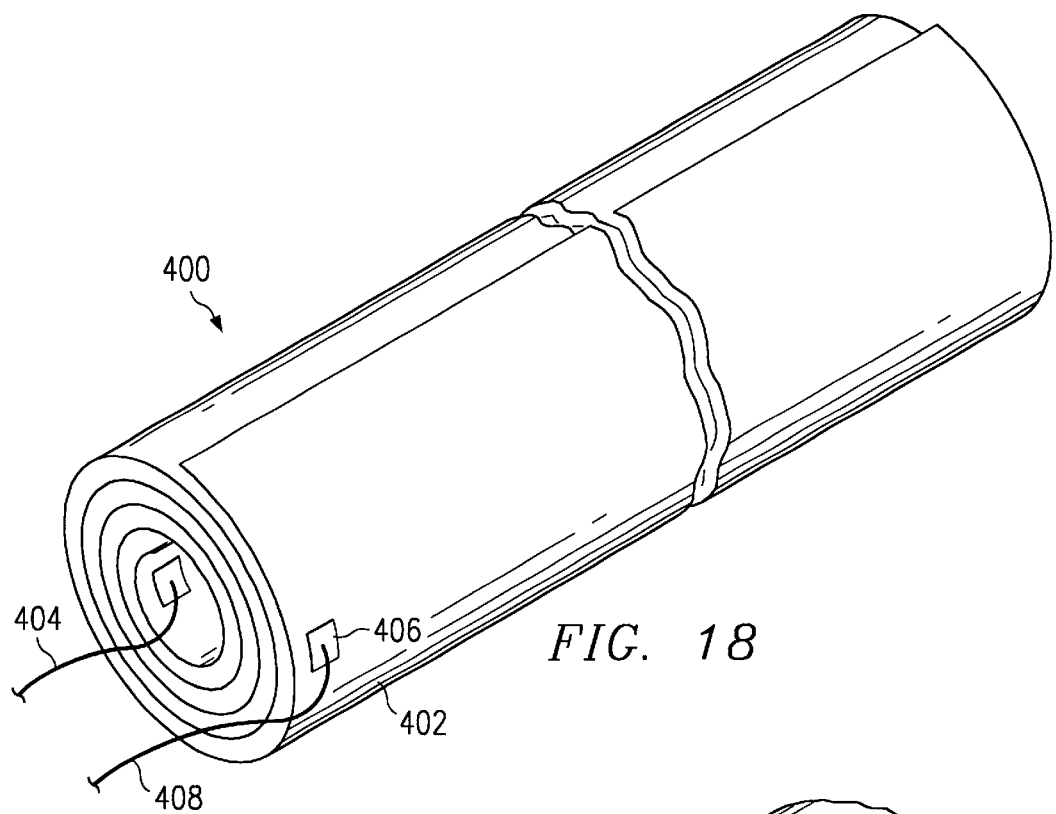
FIG. 18 is a tightly wound cylindrical energy storage capacitor structure made of the film produced as described in reference to FIG. 15.

A still further embodiment of a capacitive energy storage device in accordance with the present invention is a device 400 illustrated in FIG. 18. A length of film 402, such as prepared in accordance with the description in reference to FIG. 15, is tightly wrapped in a solid cylindrical structure with an interior conductive pad (not shown) connected to a conductive line 404 and an exterior conductive pad 406 connected to a conductive line 408. The energy storage device 400 can then be inserted into a cylindrical void area or used in an available space.

Figure 19:
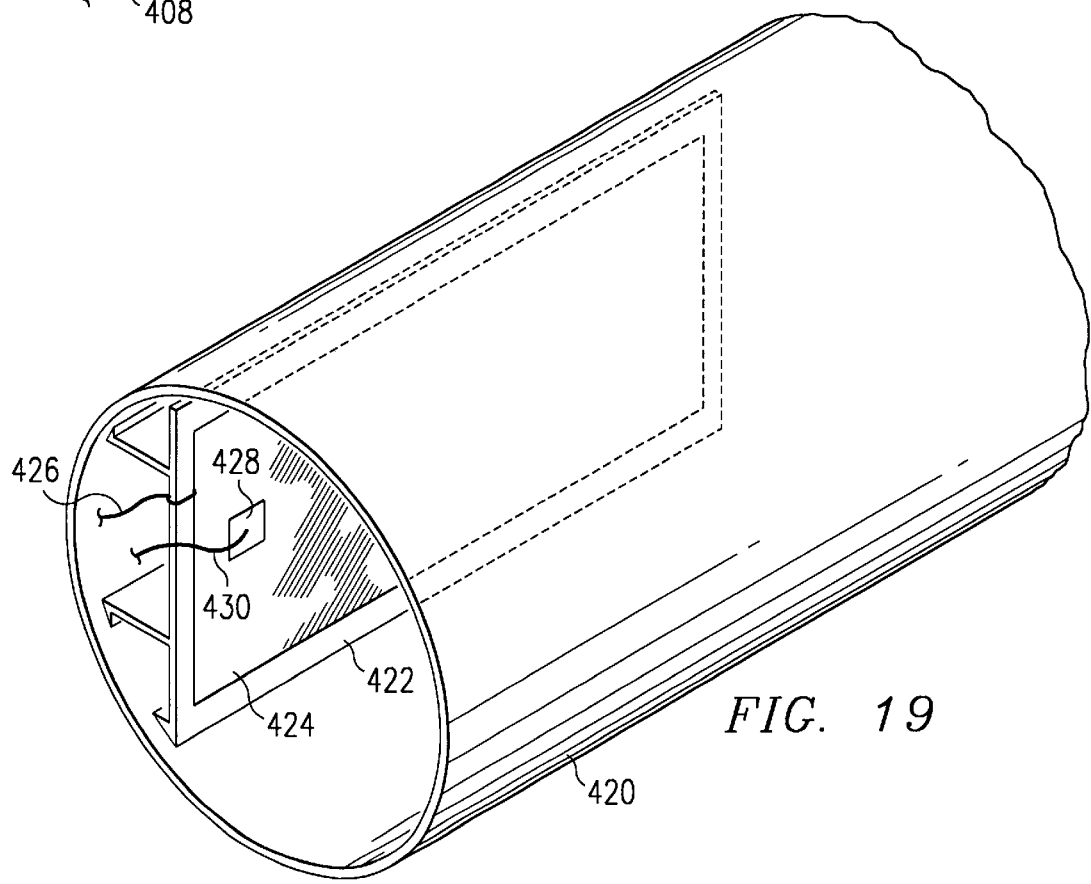
FIG. 19 is a perspective cut-away view of an airframe having an interior structural member with a layer of capacitive thin-film capacitive laminated to a load-bearing structural member.

Referring now to FIG. 19, an airframe 420, having a cylindrical configuration, includes an interior flat structural plate 422 which is connected by brackets to the interior surface of the airframe 420. A film 424, which is fabricated as described in reference to FIG. 15, is mounted on the planar surface of the structure 422 by a bonding agent such as epoxy. Electrical connections are made to the film 424 by a first pad (not shown) which is connected to a line 426. A pad 428 is formed by etching through the outer insulating layer of the film 424 and is connected to a line 430. The lines 426 and 430 are connected to a wiring harness within the airframe 420 for receiving electrical power for storage in the film 424 and later providing electrical power to devices within the airframe 420. Optionally, the capacitive structure can be fabricated on the surface of plate 422 as described above in reference to FIGS. 2A–2H.

Although several embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

What is claimed is:

1. An electrical power source for electronic equipment carried in an airborne vehicle which has an elongate body section enclosing an interior volume, comprising:
   a multi-layer capacitor structure located on a non-planar interior surface of said body section, said capacitor structure having a conformal shape to said interior surface, wherein said capacitor structure can store electrical energy therein, and
   first and second power terminals for connecting said capacitor structure to said electronic equipment for transferring electrical power from said capacitor structure to said electronic equipment.

2. An electrical power source as recited in claim 1 wherein said multi-layer capacitor structure comprises a plurality of capacitors.

3. An electrical power source as recited in claim 1 wherein said multi-layer capacitor structure includes a metallic sponge.

4. An electrical power source as recited in claim 1 wherein said capacitor structure has a cylindrical configuration.

5. An electrical power source as recited in claim 1 wherein the elongate body section of said airborne vehicle has a cylindrical configuration.

6. An electrical power source as recited in claim 1 including a first and a second insulating ring positioned respectively at opposite ends of said capacitor structure, said insulating rings bonded to said interior surface.

7. An electrical power source as recited in claim 1 wherein said capacitor structure is a structure which is fabricated on said interior surface.

8. An electrical power source as recited in claim 1 wherein said capacitor structure is a structure which is fabricated externally to said airframe vehicle and is mounted to said interior surface.

9. An electrical power source as recited in claim 1 wherein said capacitor structure comprises a plurality of layered capacitors electrically connected in parallel.

10. An integrated electronic circuit and power supply therefor, comprising:
    a planar substrate having said electronic circuit formed therewith,
    a capacitor structure joined to and parallel with said substrate, wherein said capacitor structure can store electrical energy therein,
    said capacitor structure substantially overlapping said electronic circuit, and
    first and second power terminals connecting said capacitor structure to said electronic circuit for transferring electrical power from said capacitor structure to said electronic circuit.

11. An integrated electronic circuit and power supply therefor as recited in claim 10 wherein said first and second power terminals extend through said substrate.

12. An integrated electronic circuit and power supply therefor as recited in claim 10 wherein said capacitor structure has a non-planar configuration which includes extension segments that are perpendicular to said substrate.

13. An integrated electronic circuit and power supply therefor as recited in claim 10 wherein said first and second power terminals include vias extending through said substrate.

14. An electrical power source for electronic equipment positioned in an interior space of a vehicle, comprising:
    a plurality of planar capacitor structures bonded together in parallel to form a capacitor stack,
    a shaped space at least partially defined by an exterior surface of a housing for said electronic equipment and a portion of a wall of said interior space, and
    each of said planar capacitor structures having a shape such that said capacitor stack has a exterior configuration substantially corresponding to said shaped space and wherein said capacitor stack is positioned within said shaped space.

15. An electrical power source as recited in claim 14 wherein all of said planar capacitors have a common size and shape.

16. An electrical power source as recited in claim 14 including an electrically insulating housing enclosing said capacitor stack.

17. An electrical power source as recited in claim 14 wherein said capacitor structures are connected electrically in series.

18. An electric power source for a portable device which has a housing and electric power consuming circuitry therein and the housing of the portable device has an interior surface, the power source comprising:
    a film capacitor structure joined over a majority of the area thereof to at least a portion of said interior surface of said housing, said capacitor structure conforming to the shape of said interior surface, wherein said capacitor structure can store electric energy therein, and
    first and second power terminals for connecting said capacitor structure to said power consuming circuit for transferring electrical power from said capacitor structure to said power consuming circuitry.

19. An electric power source as recited in claim 18 wherein said capacitor structure comprises a plurality of layered capacitors.

20. An electric power source as recited in claim 18 wherein said housing has a plurality of holes therein for receiving push buttons.

21. An electrical power source for electronic equipment carried in an airborne vehicle which has an elongate body section enclosing an interior volume having structural braces therein, comprising:
    a multi-layer capacitor structure having a majority of the area thereof mounted on a surface of one of said structural braces, wherein said capacitor structure can store electrical energy therein, and
    first and second power terminals for connecting said capacitor structure to said electronic equipment for transferring electrical power from said capacitor structure to said electronic equipment.

22. An electrical power source as recited in claim 21 wherein said capacitor structure is a structure which is fabricated directly on the corresponding structural brace.

23. An electrical power source as recited in claim 21 wherein said capacitor structure is a structure which is fabricated external to said airborne vehicle and is bonded to the corresponding structural brace.

* * * * *

UNITED STATES PATENT AND TRADEMARK OFFICE
CERTIFICATE OF CORRECTION

PATENT NO. : 6,477,035 B1 Page 1 of 1
DATED : November 5, 2002
INVENTOR(S) : Bruce Michael Cepas et al.

It is certified that error appears in the above-identified patent and that said Letters Patent is hereby corrected as shown below:

Title page,
Item [75], Inventors, delete "Bruce M Cepas" and "James A Korn, Jr.",
and insert -- Bruce Michael Cepas and James Allen Korn, Jr. --
Item [74], *Attorney, Agent, or Firm*, delete "Steven S. Sedacca",
and insert -- Stephen S. Sadacca --.

Column 8,
Lines 43, 53, and 55, delete "140C", and insert -- 140A --.
Line 58, delete "140C", and insert -- 148 --.

Column 10,
Line 14, delete "284A", and insert -- 286A --.
Line 14, delete "284.", and insert -- 286. --.

Column 14,
Line 15, delete "a", and insert -- an --.

Signed and Sealed this

Twenty-second Day of June, 2004

JON W. DUDAS
*Acting Director of the United States Patent and Trademark Office*